US012417510B2

(12) United States Patent
He et al.

(10) Patent No.: US 12,417,510 B2
(45) Date of Patent: Sep. 16, 2025

(54) ZOOM AGNOSTIC WATERMARK EXTRACTION

(71) Applicant: Google LLC, Mountain View, CA (US)

(72) Inventors: Dake He, Waterloo (CA); Tianhao Zhang, Sunnyvale, CA (US); Elnaz Barshan Tashnizi, Toronto (CA); Xiyang Luo, Mountain View, CA (US); Huiwen Chang, Cambridge, MA (US); Feng Yang, Sunnyvale, CA (US); Ryan Matthew Haggarty, Kitchener (CA)

(73) Assignee: Google LLC, Mountain View, CA (US)

( * ) Notice: Subject to any disclaimer, the term of this patent is extended or adjusted under 35 U.S.C. 154(b) by 472 days.

(21) Appl. No.: 18/008,544

(22) PCT Filed: Jun. 21, 2021

(86) PCT No.: PCT/US2021/038255
§ 371 (c)(1),
(2) Date: Dec. 6, 2022

(87) PCT Pub. No.: WO2022/271146
PCT Pub. Date: Dec. 29, 2022

(65) Prior Publication Data
US 2023/0325961 A1     Oct. 12, 2023

(51) Int. Cl.
*G06T 1/00* (2006.01)
*G06T 3/40* (2024.01)
*G06T 7/11* (2017.01)

(52) U.S. Cl.
CPC ............. *G06T 1/005* (2013.01); *G06T 3/40* (2013.01); *G06T 7/11* (2017.01);
(Continued)

(58) Field of Classification Search
CPC ... G06T 1/005; G06T 3/40; G06T 7/11; G06T 2201/0065; G06T 2201/0083;
(Continued)

(56) References Cited

U.S. PATENT DOCUMENTS 6,580,819 B1    6/2003   Rhoads
6,850,626 B2    2/2005   Rhoads et al.
(Continued)

FOREIGN PATENT DOCUMENTS

CN          112200710        1/2021
WO      WO 2021045781        3/2021

OTHER PUBLICATIONS

International Preliminary Report on Patentability in International Appln. No. PCT/US2021/038255, mailed on Jan. 4, 2024, 8 pages.
(Continued)

*Primary Examiner* — Christopher Wait
(74) *Attorney, Agent, or Firm* — Fish & Richardson P.C.

(57) ABSTRACT

Methods, systems, and apparatus, including computer programs encoded on a computer storage medium, for determining a visually imperceptible or a visually perceptible watermark and outputting a result based on the determination. A watermark decoder receives an input image. The watermark decoder applies a decoder machine learning model to decode a watermarks at different levels of zoom. The water mark decoder determines whether a watermark was decoded to obtain a decoded watermark. The watermark decoder outputs a result based on the determination whether the watermark was decoded through application of the decoder machine learning model to the input image that includes outputting a zoomed output decoded through application of the decoder machine learning model to the input image.

20 Claims, 7 Drawing Sheets

(52) U.S. Cl.
    CPC ............... *G06T 2201/0065* (2013.01); *G06T 2201/0083* (2013.01); *G06T 2207/20081* (2013.01)

(58) Field of Classification Search
    CPC ... G06T 2207/20081; G06T 2201/0051; G06T 1/0064
    See application file for complete search history.

(56) References Cited

U.S. PATENT DOCUMENTS

| | | |
|---|---|---|
| 7,113,615 B2 | 9/2006 | Rhoads et al. |
| 7,266,217 B2 | 9/2007 | Rhoads et al. |
| 7,720,249 B2 | 5/2010 | Rhoads |
| 8,106,744 B2 | 1/2012 | Petrovic et al. |
| 9,509,882 B2 | 11/2016 | Reed et al. |
| 10,616,439 B2 | 4/2020 | Gharaibeh et al. |
| 2008/0130945 A1 | 6/2008 | Rhoads et al. |
| 2015/0278980 A1* | 10/2015 | Sinclair ............... G06T 1/0064 382/100 |

OTHER PUBLICATIONS

Dai et al. "R-fcn: Object detection via region-based fully convolutional networks." Advances in neural information processing systems 29, 2016, 9 pages.

International Search Report and Written Opinion in International Appln. No. PCT/US2021/038255, mailed on Mar. 21, 2022, 15 pages.

Long et al., "Fully convolutional networks for semantic segmentation." Proceedings of the IEEE conference on computer vision and pattern recognition, 2015, 10 pages.

Luo et al., "Distortion Agnostic Deep Watermarking" submitted on Jan. 2020, arXiv:2001.04580V1, 14 pages.

Mun et al., "A robust blind watermarking using convolutional neural network." submitted on Apr. 2017, arXiv preprint arXiv: 1704.03248, 5 pages.

Ronneberger et al., "U-Net: Convolutional Networks for Biomedical Image Segmentation." Medical Image Computing and Computer-Assisted Intervention—MICCAI 2015. MICCAI 2015. Lecture Notes in Computer Science, vol. 9351, Oct. 2015, 8 pages.

Tancik et al., "Stegastamp: Invisible hyperlinks in physical photographs." Proceedings of the IEEE/CVF conference on computer vision and pattern recognition, 2020, 2117-2126.

Wengrowski et al., "Light field messaging with deep photographic steganography." Proceedings of the IEEE/CVF conference on computer vision and pattern recognition, 2019, 1515-1524.

Wikipedia.org [online], "Precision and recall" Nov. 2007, retrieved on Feb. 8, 2023, retrieved from URL <https://en.wikipedia.org/wiki/Precision_and_recall>, 11 pages.

Zhu et al., "Hidden: Hiding data with deep networks." Proceedings of the European conference on computer vision (ECCV), 2018, 16 pages.

* cited by examiner

ZOOM AGNOSTIC WATERMARK EXTRACTION

CROSS-REFERENCE TO RELATED APPLICATION

This application is a National Stage Application under 35 U.S.C. § 371 and claims the benefit of International Application No. PCT/US2021/038255, filed Jun. 21, 2021, the disclosure of which is incorporated herein by reference.

BACKGROUND

This specification generally relates to data processing and techniques for recovering watermarks from images.

In a networked environment such as the Internet, first-party content providers can provide information for presentation in electronic documents, for example web pages or application interfaces. The documents can include first-party content provided by first-party content providers and third-party content provided by third-party content providers (e.g., content providers that differ from the first-party content providers).

Third-party content can be added to an electronic document using various techniques. For example, some documents include tags that instruct a client device at which the document is presented to request third-party content items directly from third-party content providers (e.g., from a server in a different domain than the server that provides the first-party content). Other documents include tags that instruct the client device to call an intermediary service that partners with multiple third-party content providers to return third-party content items selected from one or more of the third-party content providers. In some instances, third-party content items are dynamically selected for presentation in electronic documents, and the particular third-party content items selected for a given serving of a document may differ from third-party content items selected for other servings of the same document.

SUMMARY

In general, one innovative aspect of the subject matter described in this specification can be embodied in methods including the operations of receiving, by a watermark decoder including one or more processors, an input image; applying, by the watermark decoder and to the input image, a decoder machine learning model trained to decode visually imperceptible watermarks at different levels of zoom; determining, by the watermark decoder, whether a visually imperceptible watermark was decoded through application of the decoder machine learning model to the input image to obtain a decoded watermark; and outputting a result based on the determination whether the visually imperceptible watermark was decoded through application of the decoder machine learning model to the input image, including outputting a zoomed output in response to determining that the visually imperceptible watermark was decoded through application of the decoder machine learning model to the input image.

In some aspects outputting a zoomed output includes outputting a zoomed version of the decoded watermark, wherein the decoded watermark has a zoom level corresponding to a zoom level of items depicted in the input image.

In some aspects outputting a zoomed output includes outputting a version of the decoded watermark in which a single pixel of the decoded watermark is depicted using more than one pixel in the zoomed output.

In some aspects outputting a result based on the determination whether the visually imperceptible watermark was decoded through application of the decoder machine learning model to the input image includes reapplying the decoder machine learning model to a zoomed version of the input image in response to determining that the visually imperceptible watermark was not decoded through application of the decoder machine learning model to the input image.

In some aspects reapplying the decoder machine learning model to a zoomed version of the input image includes: zooming the input image by at least a two times multiplier to create the zoomed version of the input image; and reapplying the decoder machine learning model to the zoomed version of the input image.

In some aspects zooming the input image by at least a two times multiplier includes using at least two pixels in the zoomed version of the input image to depict a single pixel in the input image.

In some aspects the methods further include applying a detector machine learning model to the input image; generating, based on application of the detector machine learning model to the input image, a segmentation mask that highlights watermarked regions of the input image; determining, based on the segmentation mask, that the input image includes a visually imperceptible watermark; and determining, based on the segmentation mask a zoom level of the input image based on a number of pixels used to represent the visually imperceptible watermark in the segmentation mask relative to a number of pixels used to represent the visually imperceptible watermark in unzoomed images.

Particular embodiments of the subject matter described in this specification can be implemented so as to realize one or more of the following advantages. Visually imperceptible watermarks, also referred to as simply "watermarks" for brevity, can be used to determine a source of third-party content that is presented with first-party content (e.g., at a website, in a streaming video, or in a native application). These watermarks can be extracted and decoded in a more efficient fashion than previously possible. For example, the watermark extraction and decoding techniques described in this specification implement an initial detection process that detects the presence of watermarks in an input image before attempting to decode a watermark that may be included in the image. This is motivated by considering the computer resources involved in decoding, which can be reduced by using the less computationally expensive detection process (relative to the decoding process) to filter out images that do not include watermarks thereby saving both time and computational resources required to process such input image by a computationally more expensive decoding process. In other words, rather than having to fully process the image, and attempt to decode a watermark in every image, the detection process can initially determine whether the image includes a watermark, while using fewer computing resources, and in less time than that required to perform the decoding process. In this way, use of the detection process prior to initiating the decoding process saves computing resources and enables faster identification and analysis of images that actually include watermarks by quickly filtering out images that do not include a watermark, thereby reducing the amount of data that needs to be processed. In contrast, techniques that rely solely on a decoding process for both detection and decoding of watermarked images, or processes that do not use the detection process as filter mechanism, are more computationally expensive.

The detection and decoding processes discussed herein are zoom agnostic, meaning that a watermark can be directly detected and/or decoded irrespective of the zoom level at which the image is captured. More specifically, the techniques discussed herein are used to detect and decode watermarks in reproductions of originally presented content (e.g., in pictures or screenshots of content), and the zoom level at which the originally presented content is captured will vary from one captured instance to another (e.g., from one picture to another). Absent the techniques discussed herein, the detection and/or decoding of watermarks in an input image (e.g., a reproduction, such as a picture of content presented at a client device) would require analyzing the input image at multiple different zoom levels, which wastes computing resources and time. Implementations of the disclosed methods are thus motivated by reducing the computational resources required to analyze images repeatedly at different respective zoom levers to detect or decode watermarks. The techniques discussed herein utilize a model that has been trained to detect and decode watermarks within input images without having to repeatedly analyze the input image at multiple different zoom levels. The techniques discussed herein also enable the accurate detection and decoding of watermarks within input images that have other distortions, such as distortions caused by image compression techniques (e.g., jpeg compression).

Detection and/or decoding model performance is improved (e.g., the model is more accurate) by using numerical rounding on the training data. For example, captured images are generally stored as unsigned RGB integers, but model training is performed using floating point numbers. This mismatch is typically ignored when it won't substantially effect model performance, but when detecting/decoding watermarks from images, each pixel matters, such that the degraded model performance caused by the mismatch between the unsigned RGB integers and the floating point numbers used for training can result in unacceptable model performance. Therefore, rounding techniques can be applied to the floating point numbers to improve the model training, and the ability of trained models to detect and/or decode watermarks in input images.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes systems, methods, devices and techniques for detecting and decoding visually imperceptible watermarks in captured reproductions of content (e.g., digital photos of content presented at a client device). While the description that follows describes watermark detection with respect to visually imperceptible watermarks, but the techniques can also be applied to visually perceptible watermarks. The visually imperceptible watermarks, referred to as simply "watermarks" for brevity, are semi-transparent, and visually imperceptible to a human user under normal viewing conditions, such that the watermarks can be embedded in content without degrading the visual quality of the content. The watermarks can carry information, such as an identifier of a source of the images in which they are embedded. For example, in the context of the Internet, a watermark can identify (among other information) an entity, server, or service that placed the content on a publisher's property (e.g., website, video stream, video game, or mobile application) when the publisher's property was accessed by a user. As such, when a reproduction of the content (e.g., a picture or screenshot of the content), as presented on the publisher's property, is captured and submitted for verification, the watermark can be detected and decoded to verify whether the content was, in fact, distributed by the appropriate entity, server, or service.

As discussed in detail below, the detection and decoding of the watermark can be performed by machine learning models that are trained to detect and decode watermarks irrespective of the zoom level at which the image is captured. For example, assume that the same content is presented at two different client devices of two different users. In this example, the display characteristics of one client device may cause the content to be presented at twice the size (e.g., 4× zoom) of the content as presented at the other client device (e.g., 2× zoom). As such, even if each user captures the presentation of the content at the same zoom level (e.g., using a screen capture application or a digital camera), the reproduction of the captured content will be at different zoom levels. Of course, even if the content was presented at the same size on each client device, differences in the zoom level at which the presentation of the content is captured (e.g., using a screen capture application or a digital camera) can lead to the reproductions of the content being at different zoom levels. In either case, the models discussed herein are able to detect and decode watermarks from each of the captured images of the content despite the differences in zoom level.

Figure 1:
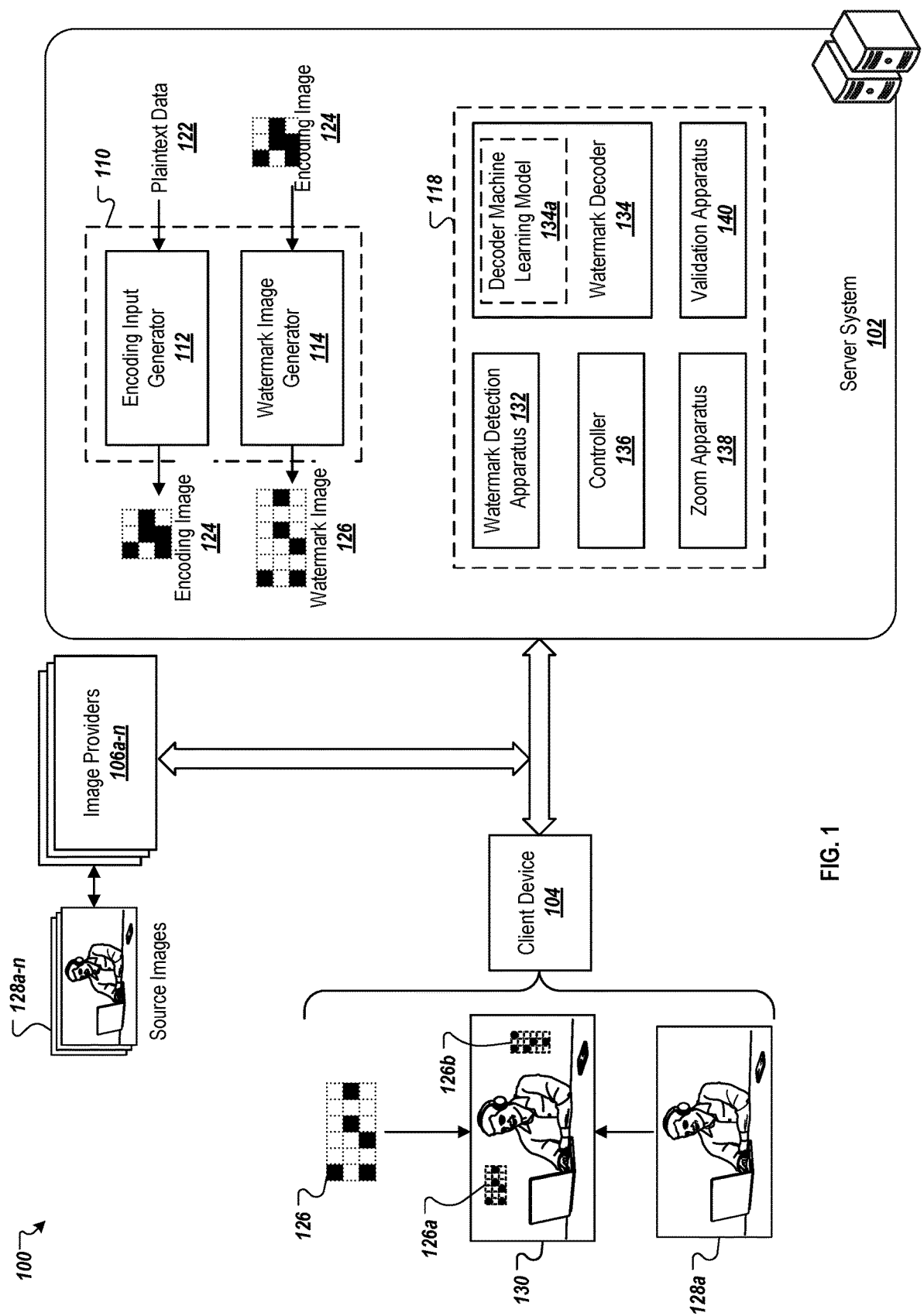
FIG. 1 is a block diagram of a computing environment for transmitting electronic documents to client devices with watermark images.

FIG. 1 is a block diagram of a networked environment 100 that implements a watermark detection apparatus 132. The environment 100 includes a server system 102, a client device 104, and computing systems for one or more image providers 106a-n. The server system 102, client device 104, and image providers 106a-n are connected over one or more networks such as the Internet or a local area network (LAN). In general, the client device 104 is configured to generate and transmit requests for electronic documents to the server system 102. Based on the requests from the client device 104, the server system 102 generates responses (e.g., electronic documents) to return to the client device 104. A given response can include content, such as a source image 128a, that is configured to be displayed to a user of the client device 104, where the source image 128*a* is provided by one of the image providers 106*a-n*. The server system 102 can augment the response served to the client device 104 with a semi-transparent watermark image 126 that is arranged for display in a presentation of the response document at the client device 104 over the source image 128*a*. For purposes of example, the description that follows will user source images 128*a-n* as examples of third-party content provided to the client device 104, but it should be appreciated that watermark images 126 can be overlaid on various other types of visible content, including native application content, streaming video content, video game content, or other visible content.

The client device 104 can be any type of computing device that is configured to present images and other content to one or more human users. The client device 104 may include an application, such as a web browser application, that makes requests to and receives responses from the server system 102. The application may execute a response from the server system 102, such as web page code or other types of document files, to present the response to the one or more users of the client device 104. In some implementations, the client device 104 includes an electronic display device (e.g., an LCD or LED screen, a CRT monitor, a head-mounted virtual reality display, a head-mounted mixed-reality display), or is coupled to an electronic display device, that displays content from the rendered response to the one or more users of the client device 104. The displayed content can include the source image 128*a* and the watermark image 126 displayed over top of the source image 128*a* in a substantially transparent manner. In some implementations, the client device 104 is a notebook computer, a smartphone, a tablet computer, a desktop computer, a gaming console, a personal digital assistant, a smart speaker (e.g., under voice control), a smartwatch, or another wearable device.

In some implementations, the source image 128*a* provided in the response to the client device 104 is a third-party content item that, for example, is not among content provided by a first-party content provider of the response. For example, if the response is a web page, the creator of the web page may include, in the web page, a slot that is configured to be populated by an image from a third-party content provider that differs from the creator of the web page (e.g., a provider of an image repository). In another example, the first-party content provider may directly link to a third-party source image 128*a*. The client device 104 may request the source image 128*a* directly from a corresponding computing system for one of the image providers 106*a-n* or indirectly via an intermediary service, such as a service provided by server system 102 or another server system. The server system 102 can be implemented as one or more computers in one or more locations.

The server system 102 can be configured to communicate with the computing systems of image providers 106*a-n*, e.g., to obtain a source image 128*a* to serve to the client device 104. In some implementations, the server system 102 is configured to respond to a request from the client device 104 with an electronic document and a semi-transparent watermark image 126 that is to be displayed in the electronic document over a source image 128*a*. To generate the semi-transparent watermark the server system 102 can include an image generation subsystem 110 that can further include an encoding input generator 112 and a watermark image generator 114.

The encoding input generator 112 can processes a plaintext data item to generate an encoding image 124 that encodes the plaintext data item. For example, the plaintext data item may be a text sample or string that includes information to identify a provider of the image or other characteristics of the image. For example, the plaintext data item can be a unique identifier identifying the image provider 106*a-n*. The plaintext data item can also include a session identifier that uniquely identifies a network session between the client device 104 and the server system 102 during which a response is served to a request from the client device 104. The plaintext data item can also include or reference image data that identifies the particular source image 128*a* served to the client device 104 or information associated with the source image 128*a* (e.g., information that indicates which of the image providers 106*a-n* provided the particular source image 128*a* served to the client device 104 and a timestamp indicating when the source image 128*a* was served or requested).

In some implementations, the server system 102 can also include a response records database 120 that stores data that correlates such information about a source image 128*a* or a response served for a particular request, in order to make the detailed information accessible via the session identifier or other information represented by the plaintext data item. The response records database 120 can also associate a session identifier with image data, thereby making the image data accessible by querying the database 120 using the session identifier represented by the plaintext data item. A user can then identify, for example, which of the source images 128*a-n* was served to the client device 104 at what time and from which image provider 106*a-n* for using the session identifier from the plaintext data item.

The watermark image generator 114 of the server system 102 can be configured to process the encoding image 124 to generate a semi-transparent watermark image 126. The semi-transparent watermark image 126 is derived from the encoding image 124 and also encodes the plaintext data item 122. However, the transparencies, colors, arrangement of encoded pixels and/or other features of the watermark image 126 may be changed from the transparencies, colors, arrangement of encoded pixels and/or other features of the encoding image 124. For example, whereas the encoding image 124 may be uniformly opaque and consist of encoded pixels that are closely packed adjacent to each other, the watermark image 126 may include some fully transparent pixels and some partially transparent pixels. Moreover, the encoded pixels in the watermark image 126 may be spaced relative to each other so that each encoded pixel is surrounded by non-encoded pixels (i.e., "blank" pixels). The transformation of the encoding image 124 to the watermark image 126 may be performed so that, after the watermark image 126 is overlaid and merged on a background source image 128*a*, the encoded information may be decoded, e.g., by reconstructing the encoding image 124 or the watermark image 126.

In some implementations, the encoding image 124 is a matrix-type barcode that represents the plaintext data item 122. One example of a suitable matrix-type barcode is a Quick Response Code (QR code). The encoding image 124 can have a pre-defined size in terms of a number of rows and columns of pixels. Each pixel in the encoding image 124 can encode a binary bit of data, where the value of each bit is represented by a different color. For example, a pixel that encodes the binary value '1' may be black while a pixel that encodes the binary value '0' may be white. In some implementations, the smallest encoding unit of an encoding image 124 may actually be larger than a single pixel. But for purposes of the examples described herein, the smallest encoding unit is assumed to be a single pixel. It should be appreciated, however, that the techniques described herein may be extended to implementations where the smallest encoding unit is a set of multiple pixels, e.g., a 2×2 or 3×3 set of pixels. An example encoding image 124 is further explained with reference to FIG. 2.

Figure 2:
FIG. 2 is a depiction of an example encoding image in the form of a two-dimensional binary quick-response code (QR-code).

FIG. 2 depicts an example QR-code 200 that can serve as an encoding image, e.g., encoding image 124 for purposes of the techniques described in this specification. The QR-code 200 has a fixed size of 21×21 pixels in this example, although QR-codes of other pre-defined sizes would also be suitable. A distinctive feature of the QR-code 200 is its three 7×7 pixel squares 202a-202c located at the top-left, top-right, and bottom-left corners of code 200. The square patterns 202a-c aid optical-reading devices in locating the bounds of QR-code 200 and properly orienting an image of QR-code 200 so that rows and columns of pixels can be ascertained and the code 200 can be successfully read. Each square pattern is defined by seven consecutive black pixels (e.g., encoded value 1) in its first and seventh rows, the pattern black-white-white-white-white-white-black (e.g., encoded values 1-0-0-0-0-0-1) in the second and sixth rows, and the pattern black-white-black-black-black-white-black (e.g., encoded values 1-0-1-1-1-0-1) in the third, fourth, and fifth rows. A watermarking image can be formed from the QR-code 200 as described with respect to FIG. 1, including by assigning a high-partial transparency value to each black pixel in the code 200, applying a full-transparency value to each white pixel in the code 200, inserting a blank (non-encoded) fully transparent pixel to the right of each pixel from the QR-code 200 in each odd-numbered row, and inserting a blank fully transparent pixel to the left of each pixel from the QR-code 200 in each even-numbered row of the code 200. The result is a 21×43 pixel watermarking image that can be overlaid on a source image that is to be encoded.

Continuing with the discussion with reference to FIG. 1, the watermark image 126 may be generated directly from the plain text data without explicitly generating the encoding image 124 as an intermediate operation on the way to achieving watermark image 126. In some implementations, the server system 102 can directly merge the watermark image 126 over top of the source image 128a for service of the merged image to the client device 104, the server system 102 may directly encode the watermark in the source image 128 without explicitly generating the encoding image 124, watermark image 126, or both.

The server system 102, after generating the watermark image 126, generates a response to return to the client device 104 as a reply to the client's request for an electronic document. The response can include one or more content items, including first-party content items and third-party content items, which collectively form an electronic document such as a web page, an application interface, a PDF, a presentation slide deck, or a spreadsheet. In some implementations, the response includes a primary document that specifies how various content items are to be arranged and displayed. The primary document, such as a hypertext markup language (HTML) page, may refer to first-party content items and third-party content items that are to be displayed in the presentation of the document. In some implementations, the server system 102 is configured to add computer code to the primary document that instructs the client device 104, when executing the response, to display one or more instances of the watermark image 126 over the source image 128a, e.g., to add a watermark to the source image 128a that is substantially imperceptible to human user. Because the watermark image 126 has fully and partially-transparent pixels, the application at the client device 104 that renders the electronic document can perform a blending technique to overlay the watermark image 126 on the source image 128a according to the specified transparencies of the watermark image 126. For example, the server system 102 may add code that directs the client device 104 to display the source image 128a as a background image in a third-party content slot in an electronic document and to display one or more instances of the watermark image 126 as a foreground image over the image 128a.

In an environment where there can be millions of images (and other visual content) that are distributed to many different client devices 104, there can be situations when the server system 102 needs to determine the providers or sources of the images (or other visual content), other characteristics of the images, or context about a specific impression (e.g., presentation) of the images. For example, a user of the client device 104 may receive an inappropriate or irrelevant image 128a from one of the image providers 106a-n in response to a request for an electronic document. The user may capture a screenshot of the encoded image 130 (e.g., a reproduction of the image or other content presented at the client device 104) and transmit the screenshot to the server system 102 for analysis, e.g., to inquire about the origin of the source image 128a. Because the screenshot shows the original image 128a overlaid by the watermarking image 126, the server system 102 can process the screenshot to recover an encoded representation of the plaintext data item, which in turn can be decoded to recover the plaintext data item itself. The system 102 can then use the recovered plaintext data item for various purposes, e.g., to query the response records database to lookup detailed information about the image 128a and its origins, or other information about the particular client session in which the source image 128a was served to the client device 104.

To detect and decode an encoded representation of the plaintext data item 122 from an encoded source image 130, the server system 102 can include an image analysis and decoder module 118. The encoded source image 130 is an image that results from the client device 104 rendering the watermark image 126 over the source image 128a. Even though the watermark image 126 is separate from the source image 128a, the encoded source image 130 processed by the image analysis and decoder module 118 may be a merged image showing the watermark image 126 blended over the source image 128a. The encoded source image 130 can also be referred to as an input image because the encoded source image 130 can be input to the image analysis and decoder module 118 to detect and/or decode watermarks that are part of the encoded source image 130. The encoded source image 130 that is captured and submitted to the image analysis and decoder module 118 may be a reproduction (e.g., a screenshot or other digital capture) of the presentation of the watermark image 126 over the source image 128a. As such, the original source image 128a and the original watermark image 126 may not be submitted to the image analysis and decoder module 118 for analysis.

In some cases, the server system 102, including image analysis and decoder module 118, may receive requests to analyze possibly encoded/watermarked images. As used herein, the term "possibly" refers to a condition of an item that might be attributable to the item but that is nonetheless unknown to a processing entity (e.g., server system 102) that processes the item. That is, the possible condition of an item is a candidate condition of an item for which its truth is unknown to the processing entity. The processing entity may perform processing to identify possible (candidate) conditions of an item, to make a prediction as to the truth of a possible (candidate) condition, and/or to identify possible (candidate) items that exhibit a particular condition. For example, a possibly encoded source image is a source image that is possibly encoded with a watermark, but it is initially unknown to the server system 102 whether the image actually has been watermarked. The possible encoding of the source image 128a with a watermark is thus a candidate condition of the source image, and the source image is a candidate item exhibiting the condition of being encoded with a watermark. The possibly encoded image may result from a user capturing a screenshot (or another digital reproduction, such as a digital photo) of the source image and providing the captured image to server system 102 for analysis, but without more information that would indicate a confirmation as to whether the image had been encoded/watermarked.

In these cases where the server system 102 receives a possibly encoded (watermarked) source image 130, the image analysis and decoder module 118 can include a watermark detection apparatus 132 that can implement one or more machine learning models (referred to as detector machine learning models) for detecting whether the possibly encoded source image likely does or does not contain a watermark. The watermark detection apparatus 132 can identify possibly encoded regions of the possibly encoded source image and may determine values for features of the possibly encoded source image 130. For brevity, a possibly encoded source image can also be referred to as a possibly encoded image.

If the watermark detection apparatus 132 detects a visually imperceptible watermark in the encoded source image 130, a watermark decoder 134 implemented within the image analysis and decoder module 118 completes one or more attempts to decode the possibly encoded image. As explained in further detail with respect to other figures, the watermark decoder 134 can implement one or more machine learning models (referred to as decoder machine learning models) that are configured to process the possibly encoded regions of the possibly encoded image and the features of the possibly encoded image 302 to predict the watermark status of the possibly encoded image. In this example, the watermark decoder 134 implements the decoder machine learning model 134a that is explained further with reference to FIG. 3-6. The image analysis and decoder module 118 can also include a zoom apparatus 138 and validation apparatus 132, which are discussed in more detail below. The image analysis and decoder module 118 and any subsystems can be implemented on one or more computers in one or more locations where the server system 102 is implemented.

Figure 3:
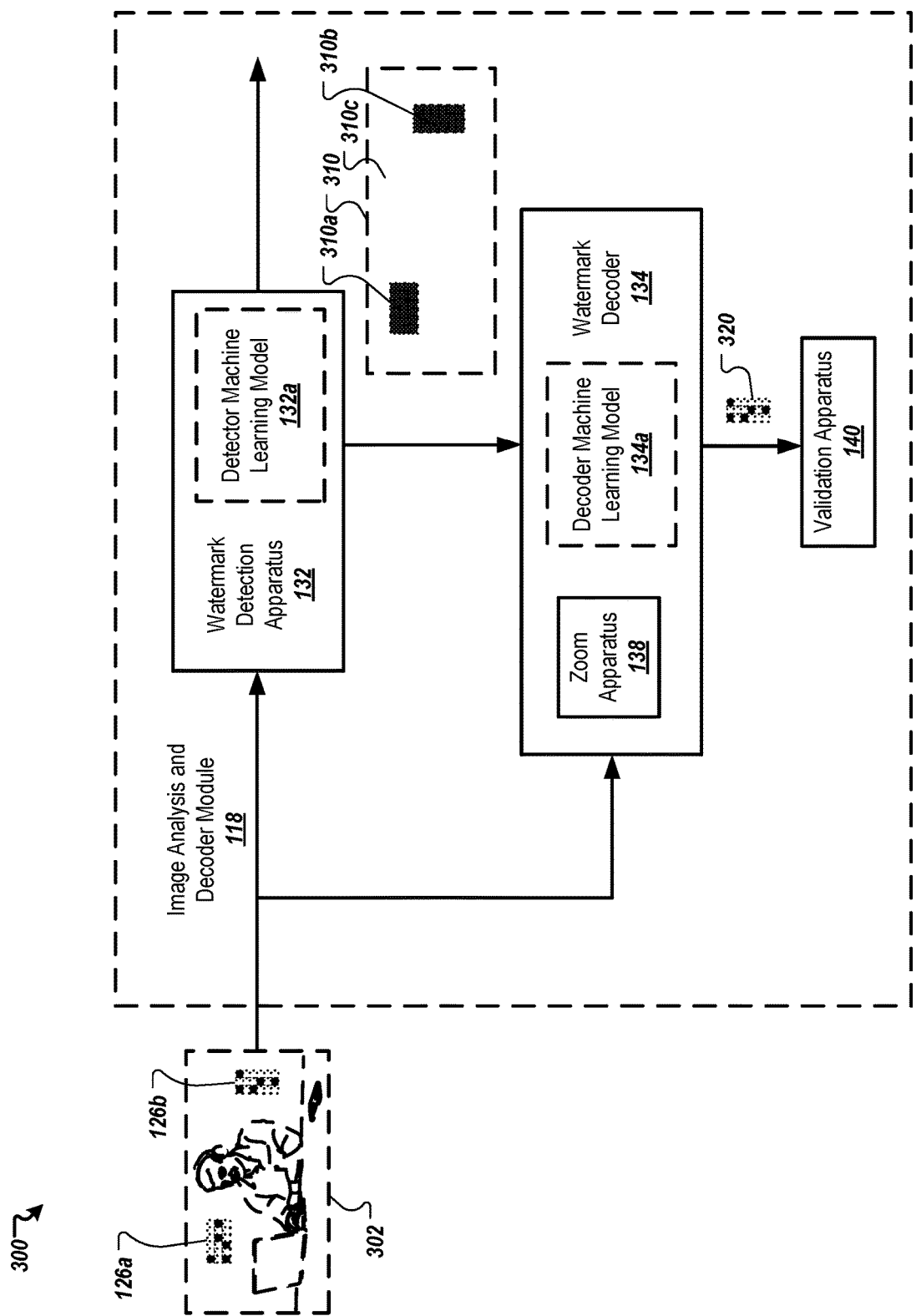
FIG. 3 is a block diagram of an image analysis and decoder module.

FIG. 3 is a block diagram 300 of an example image analysis and decoder module 118 that detects and decodes an encoded representation of the plaintext data item 122 from a possibly encoded image 302 that is input to the image analysis and decoder module 118. The possibly encoded image 302 can be in the form of a screen capture or digital photo of an image presented at a client device. For example, the possibly encoded image 302 can be a screen capture of an image presented on a publisher website. More specifically, the possibly encoded image 302 could have been captured by a user who visited the publisher's website, and then submitted by the user to report the presentation of the image (e.g., as inappropriate). The image analysis and decoder module 118 can include one or more of a watermark detection apparatus 132, a watermark decoder 134, a controller 136, a zoom apparatus 138 and a validation apparatus 140.

In some implementations, the watermark detection apparatus 132 can implement a machine learning model (referred to as a detector machine learning model 132a) that is configured to process the possibly encoded image 302 and generate, as output, an indication of whether the possibly encoded image 302 includes a portion of a watermark or one or more watermarks. The detector machine learning model 132a can be any model deemed suitable for the specific implementation, such as decision trees, artificial neural networks, genetic programming, logic programming, support vector machines, clustering, reinforcement learning, Bayesian inferencing, etc. Machine learning models may also include methods, algorithms and techniques for computer vision and image processing for analyzing images.

In some implementations, the watermark detection apparatus 132 can also implement a heuristics-based approach, or another appropriate model-based or rules-based technique, which determines whether the possibly encoded image 302 includes watermarks. In such implementations, the indication of whether the possibly encoded image 302 includes a portion of a watermark or one or more watermarks can be of the form of a classification or a number such as a score or a probability. For example, the detector machine learning model 132a can be implemented as a classification model that can process the possibly encoded image 302 to classify the image as an image that includes a watermark or an image that does not include a watermark. In another example, the detector machine learning model 132a can process the possibly encoded image 302 to generate a score such as a score that indicates a likelihood that the possibly encoded image 302 includes a watermark.

In some implementations, the watermark detection apparatus 132 can implement the detector machine learning model 132a to perform semantic image segmentation. Semantic image segmentation is a process of classifying each pixel of an image into one or more classes. For example, the detector machine learning model 132 can process the possibly encoded image 302 to classify each pixel of the possibly encoded image 302 into a first class and a second class. In this example, the first class corresponds to pixels of the image 302 that are encoded (or overlapped during display on the client device 104) using the watermark image and the second class corresponds to pixels of the image 302 that are not encoded using the watermark image. The detector machine learning model 132a classifies the pixel based on the pixel characteristics of the possibly encoded image 302. For example, the pixels classified as the first class (i.e., encoded using the watermark image) even though visually imperceptible to a human eye, is distinguishable to the detector machine learning model 132a. For example, a 32-bit RGB pixel includes 8 bits for each color channel (e.g., Red (R), Green (G) and Blue (B)) and an "alpha" channel for transparency. Such a format can support 4,294,967,296 color combinations that are identifiable by a computing system even though a portion of these combinations are indistinguishable to the human eye.

In some implementations, the detector machine learning model 132a can generate, as output, a segmentation mask that identifies a set of encoded pixels that are watermarked. For example, the detector machine learning model 132a, after classifying the pixels of the possibly encoded image 302 into the first class and the second class, can generate a segmentation mask by assigning labels to the pixels pertaining to the class to which the pixels are assigned. For example, the detector machine learning model 132a receives, as input, a possibly encoded image 302 (e.g., a screenshot from the client device 104) of dimension 1000×1000×3 and generates, as output, a segmentation mask of dimension 1000×1000×1 where each value of the segmentation mask corresponds to the label assigned to a respective pixel of the possibly encoded image 302. For example, if a pixel of the possibly encoded image 302 is classified as the first class, it can be assigned a label "1" and if the pixel is classified as the second class, it can be assigned a label "0". In this example, the segmentation mask 310 is generated by the detector machine learning model 132a by processing the possibly encoded image 302. As seen in the FIG. 3, the possibly encoded image 302 includes two watermarks 126a and 126b in two different regions of the possibly encoded image 302. The segmentation mask 310 identifies the watermarks 126a and 126b as 310a and 310b as the region of the possibly encoded image 302 that includes watermarks. Upon detecting the watermarks, the possible encoded image 302 can be classified as an encoded image, and processed by the watermark decoder 134, as discussed in detail below.

In another example, the detector machine learning model 132a can generate a segmentation mask for each class of the detector machine learning model 132a. For example, the detector machine learning model 132a can generate a segmentation mask of dimension 1000×1000×NumClass where NumClass=2 is the number of classes of the detector machine learning model 132a. In this example, the segmentation mask can be interpreted as two 1000×1000 matrices where the first matrix can identify the pixels of the possibly encoded image 302 that belong to the first class and the second matrix can identify the pixels of the possibly encoded image 302 that belong to the second class. In such situations, the labels "0" and "1" are used indicate whether a pixel belongs to a particular class or not. For example, values of the first matrix whose corresponding pixels of the possibly encoded image 302 are classified as the first class, have a label "1" and elements whose corresponding pixels are classified as the second class, have a label "0". Similarly, values of the second matrix, elements whose corresponding pixels of the possibly encoded image 302 are classified as the second class, have a label "1" and elements whose corresponding pixels are classified as the first class, have a label "0".

In some implementations, the detector machine learning model 132a can be deep convolutional neural network (CNN) with a UNet architecture that is trained to perform semantic segmentation of the possibly encoded image 302 to detect regions of the possibly encoded image 302 that includes watermarks. The CNN with the UNet architecture is described in more detail in Ronneberger O., Fischer P., Brox T. (2015) U-Net: Convolutional Networks for Biomedical Image Segmentation. In: Navab N., Hornegger J., Wells W., Frangi A. (eds) Medical Image Computing and Computer-Assisted Intervention-MICCAI 2015. MICCAI 2015. Lecture Notes in Computer Science, Vol 9351. Springer, Cham. https://doi.org/10.1007/978-3-319-24574-4_28, the entire content of which is hereby incorporated by reference in its entirety. As for another example, the detector machine learning model 132 can be a region based convolutional neural network (R-CNN).

In some implementations, the detector machine learning model 132a can include a plurality of training parameters. The detector machine learning model 132a is trained on a first training dataset using a training process that can adjust the plurality of training parameters to generate an indication of whether the possibly encoded image 302 includes a portion of a watermark or one or more watermarks. The first training dataset can include multiple training samples where each training sample includes a training image that is watermarked and a target that identifies the pixels of the training image that are encoded using the watermark. For example, the training image can be an image similar to the screenshot from the client device 104 that includes watermarks in one or more regions of the training image. The target corresponding to the training image can include a segmentation mask that identifies the pixels that are either watermarked or not watermarked and in some cases identifies both watermarked and non-watermarked pixels of the training image.

In order to enhance the generalization potential of the detector machine learning model 132a, the training process can augment the first dataset by generating new training samples using the existing training samples of the first dataset. To generate the new training samples, the training process can distort images among a set of training images to create distorted images. In some implementations, the distorted images can be generated by applying visual perturbations that widely occur in real-world visual data such as horizontal and vertical flips, translations, rotation, cropping, zooming, color distortions, adding random noise etc. The training process can also generate new training samples by encoding the training images into different file formats using lossy compression or transformation techniques. For example, the training process can use JPEG compression to introduce small artifacts in the training images and the training images generated after compression can be used to augment the first dataset.

The training process can generate multiple different zoomed versions of the same image of the first dataset to create a training set that trains the detector machine learning model 132a to detect watermarks in images across various zoom levels. For example, given a particular training image, multiple different versions of the training image can be created by changing a zoom level of items depicted in the image, thereby creating zoomed versions of the particular training image.

During training, the training process can adjust the plurality of parameters of the detector machine learning model 132a using a loss function such as cross entropy loss. For example, a pixel-wise cross entropy loss can examine each pixel individually to compare the class predictions with the target class of the pixels and adjust the parameters of the detector machine learning model 132a accordingly. The training process can be iterative in nature where during each iteration, the training process aims to minimize the cross entropy loss until the loss is less than a specified threshold or until the training process has executed a specified number of iterations. The cross entropy loss can take the following form $$L = -(y \log(p) + (1-y)\log(1-p))$$

where y is target label of a pixel and p is the predicted possibility that the pixel belongs to the first class. Examples of other loss functions can include weighted cross entropy loss, focal loss, sensitivity-specificity loss, dice loss, boundary loss, hausdorff distance loss or a compound loss that can be computed as an average of two or more different types of loss.

In some implementations, the image analysis and decoder module 118, in response to detecting a presence of watermark in the possibly encoded image 302 by the watermark detection apparatus 132, routes the possibly encoded image 302 and one or more outputs generated by the watermark detection apparatus 132 (e.g., the segmentation mask generated by the detector machine learning model 132a) to the watermark decoder 134 for decoding and extraction of the watermark of the possibly encoded image 302. For example, if the watermark detection apparatus 132 detects a presence of a watermark in the possibly encoded image 302, the possibly encoded image 302 is classified as an encoded image, and the image analysis and decoder module 134 can use the watermark decoder 134 to decode the watermark that has been detected. In situations when the watermark detection apparatus 132 fails to detect a presence of a watermark in the possibly encoded image 302, the image analysis and decoder module 118 ignores the possibly encoded image 302 and does not process it further using the watermark decoder 134, thereby saving computational resources that would have been required to attempt to decode a watermark.

In some implementations, the watermark decoder 134 implements a process of decoding a watermark that generally involves identifying the encoded values of the encoded pixels in the possibly encoded image 302, e.g., to determine whether each encoded pixel corresponds to a black pixel (value 1) in the encoding source image (e.g., a QR-code) or a white pixel (value 0) in the encoding source image. Once the position or coordinate of an encoded pixel has been ascertained, various decoding techniques can be employed to discern the encoded value of the pixel. For example, the color of the pixel may be compared to its neighboring pixels, and if the color of the pixel is darker than its neighboring pixels by a certain amount, then it may be considered to encode a black pixel (value 1) from the encoding image. If the color of the pixel is not darker than its neighboring pixels by the requisite amount, then it may be considered to encode a white pixel (value 0) from the encoding image. Moreover, the same encoded pixel from multiple instances of the watermarking image encoded in the source image may be analyzed and the results statistically averaged. In some implementations, a machine-learning model (referred to as the decoder machine learning model 134a) may be trained to perform a decoding analysis.

In some situations, even if the watermark detection apparatus 132 successfully detects a presence of watermark on the possibly encoded image 302, the watermark decoder 134 may not be able to decode the watermark. Such a situation may arise when the watermark detection apparatus 132 can detect one or more pixels that are encoded however the possibly encoded image 302 has been down-sampled, or is either zoomed-in or zoomed-out from its original native zoom level to an extent that the watermark decoder 134 cannot decode the watermark. For example, a component of the system may down-sample the image as part of the image processing, which can lead to a lower image resolution that inhibits the decoding of the possibly encoded image 302. In another example, the user's device may have captured a zoomed view of the image at the time the screenshot was obtained such that the image has lower resolution than the original source image and watermarking images. Moreover, the screenshot may include noise as a result of file compression that reduces the storage and/or transmission expense of the screenshot.

In situations where the watermark decoder 134 is unable to accurately decode a possibly encoded image 302, or in situations where the watermark decoder 134 is not performing with at least a specified level of accuracy, a zoom trick can be used to improve the ability of the watermark decoder to decode possibly encoded images. The zoom trick can be carried out by a zoom apparatus 138 that is configured to receive as input, a possibly encoded image 302 that was routed by the watermark detection apparatus 118, and output a zoomed version of the image features. More specifically, the zoom apparatus 138 generates at least one scaled version of the possibly encoded image 302 that can be used to decode the watermark of the possibly encoded image 302. For example, if it is desired to improve the accuracy of the watermark decoder 134, the zoom apparatus 138 can generate a scaled version of the possibly encoded image 302 by increasing the resolution of the image features (e.g., by 2× or some other appropriate zoom amount), thereby increasing the resolution of the watermark features, which will increase the accuracy of the watermark decoder 134. Of course, any number of scaled versions of the possibly encoded image 302 may be generated, but in practice, a single zoomed version of the possibly encoded image should be sufficient.

In some implementations, where the watermark detection apparatus 118 generates only an indication for e.g., a confirmation that the possibly encoded image 302 includes watermarks rather than a segmentation mask, the watermark decoder 134 can implement a watermark pixel extraction apparatus to identify possible regions of the watermark instead of iteratively searching across the possibly encoded image 302. The watermark pixel extraction apparatus can implement techniques of image segmentation as described with reference to the detector machine learning model 132a. For example, the watermark pixel extraction apparatus can implement a machine learning model such a U-Net trained to semantically segment the possibly encoded image 302 to generate a segmentation mask 310 that is of the same resolution as the possibly encoded image 302. In other implementations, if the detector machine learning model 132a identifies the possible regions of the watermark on the possibly encoded image 302 such as by generating a segmentation mask that identifies pixels of the possibly encoded image 302 that are watermarked, the image analysis and decoder module 118 can bypass the watermark pixel extraction apparatus and use the decoder machine learning model 134a to decode the watermark of the possibly encoded image 302.

In some implementations, the image analysis and decoder module 118 can determine, based on the segmentation mask the zoom-level of the possibly encoded image 302. Since the segmentation mask identifies the region that is watermarked, the image analysis and decoder module 118 can determine the characteristics of the watermarked region, such as the number of pixels in the region, to determine the zoom level of the possibly encoded image 302. For example, assume that the area identified as the watermarked region is twice as large as the known size of the watermark. In this example, the zoom level would be deemed to be 200% or 2×, such that the image would be determined to be captured at a 2× zoom level. In such implementations, the image analysis and decoder module 118 can use this information to assist in the decoding the watermark image of the possibly encoded image 302, for example, by informing the model that will decode the image of the zoom level.

In some implementations, the image analysis and decoder module 118 can generate scaled versions of the possibly encoded image 302 in response to the watermark pixel extraction apparatus (or the watermark detection apparatus 132) not being able to detect and/or extract the entire region of the possibly encoded image 302 that is watermarked. For example, assume that the segmentation mask generates only a portion of watermarked region. In such situations, the watermark decoder 134 will not be able decode the watermark due to incomplete information. In such situations, image analysis and decoder module 118 can generate scaled versions of the possibly encoded image 302 using the zoom apparatus 138 and check whether the entire region of the possibly encoded image 302 that is watermarked can be identified before decoding.

In some implementations, the decoder machine learning model 134a is configured to process the possibly encoded image 302, and generate, as output, a decoded watermark image 320 (also referred to as a predicted watermark image 320). The decoder machine learning model 134a can be any model deemed suitable for the specific implementation, such as decision trees, artificial neural networks, genetic programming, logic programming, support vector machines, clustering, reinforcement learning, Bayesian inferencing, etc. Machine learning models may also include methods, algorithms and techniques for computer vision and image processing for analyzing images. In some implementations, the watermark detection apparatus 132 can also implement a heursitics-based approach, or another appropriate model-based or rules-based techniques that can generate the decoded watermark image 320.

In some implementations, the decoder machine learning model 134a can be deep convolutional neural network (CNN) with a UNet architecture that is trained to predict the decoded watermark image 320 of the possibly encoded image 302. The decoder machine learning model 134a can include a plurality of training parameters and the decoder machine learning model 134a is trained on a second training dataset using a training process that can adjust the plurality of training parameters to generate a prediction (e.g., decoded watermark image 320) of the watermark image 126. The second training dataset can include multiple training samples where each training sample includes a training image that is watermarked, a form of identification of the regions of the training image that includes the watermark (e.g., a segmentation mask identifying the watermarked pixels and the non-watermarked pixels) and a target that includes the watermark image of the watermark in the training image.

In order to enhance the generalization potential of the decoder machine learning model 134a can augment the second dataset by generating new training samples using the existing training samples of the second dataset. To generate the new training samples, the training process can distort training images among the set of training images to create distorted images that are used to train the model. In some implementations, the distorted images can be generated by applying visual perturbations that widely occur in real-world visual data such as horizontal and vertical flips, translations, rotation, cropping, color distortions, adding random noise etc. In some implementations, the training process can generate new training samples by encoding the training images into different file formats using lossy compression or transformation techniques. For example, the training process can use JPEG compression to introduce small artifacts in the training images and the training images generated after compression can be used to augment the first dataset.

The training process can generate multiple different zoomed versions of the same image of the second dataset to create a training set that trains the decoder machine learning model 134a to decode watermarks in images across various zoom levels. For example, given a particular training image, multiple different versions of the training image can be created by changing a zoom level of items depicted in the image, thereby creating zoomed versions of the particular training image. Since zooming at different levels changes the number of pixels used to represent a single pixel in a training image, the decoder machine learning model 134a when trained using the augmented images, becomes agnostic to the number of pixels used to represent the watermark.

In some implementations, the training process can further augment the second training dataset by rounding floating point numbers that represent color of pixels of the training images. In such situations, the training images are floating point images such as in ARRIRAW, Blackmagic RAW, DNG, DPX, EXR, PSD, and TIFF image formats. Since floating-point images offer the greatest accuracy and dynamic range, the decoder machine learning model 134a is trained on augmented floating point images to enhance the generalization potential so as to cover the entire spectrum of all possible image formats and other image characteristics. For example, the floating point numbers of the floating point images can be rounded using normal rounding where the rounded value is the closest decimal value to the floating point number. In another example, the floating point numbers of the floating point images can be rounded using floor rounding where the rounded value is the decimal portion of the floating point number.

During training, the training process can adjust the plurality of parameters of the decoder machine learning model 134a using a loss function such as cross entropy loss. For example, a pixel-wise cross entropy loss can examine each pixel individually to compare the pixels predictions of the decoded (predicted) watermark image 320 with the pixels of the target watermark image and adjust the parameters of the decoder machine learning model 134a accordingly. The training process can be iterative in nature where during each iteration, the training process aims to minimize the L2 loss until the loss is less than a specified threshold or until the training process has executed a specified number of iterations.

In some implementations, after generating the decoded watermark image 320 by processing the possibly encoded image 302, the watermark decoder 134 can generate, as output, the decoded watermark image 320 that can be used by the image analysis and decoder module 118 to validate the authenticity (or source) of the possibly encoded image 302. To validate the authenticity (or source), the validation apparatus 140 implemented within the server system 102 can use the decoded watermark image 320 to recover a corresponding encoding image 124 and/or a corresponding plaintext data item 122. If the possibly encoded image 302 was provided to the client device 104 as a response from the server system 102, the validation apparatus 140 can validate the authenticity of the possibly encoded image 302 using the corresponding encoding image 124 and/or a corresponding plaintext data item 122. For example, the corresponding encoding image 124 and/or a corresponding plaintext data item 122 is valid if the server system 102 can identify the corresponding encoding image 124 and/or a corresponding plaintext data item 122 from the response records database 120. The server system 102 can further determine, based on the corresponding encoding image 124 and/or a corresponding plaintext data item 122, information about a source image 128a, such as the provider of the source image 128a, and details of the response served for the particular request. If the corresponding encoding image 124 and/or a corresponding plaintext data item 122 cannot be identified, the server system 102 can determine that the possibly encoded image 302 was not transmitted by the server system 102. In other words, if the information identifying the source of the possibly encoded image 302 is not decoded, the image analysis and decoder module 118 can determine that the possibly encoded image 302 was not distributed by the server system 102 since content distributed by the server system 102 is encoded with information identifying the server system 102 as the source of the content.

In some implementations, the watermark decoder 134 can generate, as output, a decoded watermark image 320 that is scaled from its original zoom level according to the scaling performed on the version of the possibly encoded image 302. For example, to generate the decoded watermark image 320, the watermark decoder 134 can generate a 200 percent (2×) zoom level scaled version of the possibly encoded image 302 using the zoom apparatus 138. This type of zooming can help improve the likelihood that a watermark is properly decoded, as discussed above. For example, if the original possibly encoded image 302 has a relatively small portion encoded with the watermarking image, the decoded watermark image 320 may prove insufficient for the decoder machine learning model 134*a* to generate the decoded watermark image 320. In such a situation, the decoded watermark image 320 generated by the decoder machine learning model 134*a* can be zoomed to assist in the decoding process.

Figure 4:
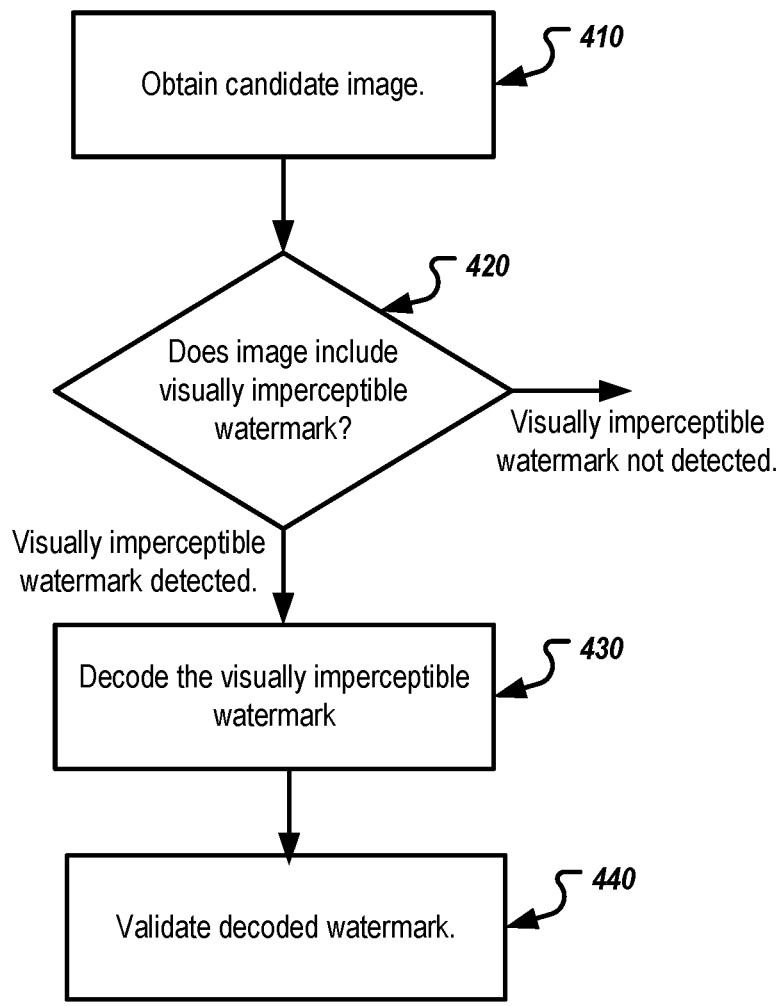
FIG. 4 is a flow diagram of an example process of predicting whether a captured source image (e.g., a screenshot) is encoded with one or more watermarking images.

FIG. 4 is a flow diagram of an example process 400 of predicting whether a possibly encoded image (e.g., a screenshot of content presented at a client device) is encoded with one or more watermarking images. Operations of the process 400 can be implemented, for example, by the server system 102 that includes the image analysis and decoder module 118. Operations of the process 400 can also be implemented as instructions stored on one or more computer readable media which may be non-transitory, and execution of the instructions by one or more data processing apparatus can cause the one or more data processing apparatus to perform the operations of the process 400.

Possibly encoded images are obtained (410). In some implementations, the possibly encoded images, also referred to as candidate images, are obtained by the image analysis and decoder module 118, which includes one or more data processing devices, and/or the watermark detection apparatus. For example, a user of the client device 104 may receive an inappropriate or irrelevant content (e.g., images or video) in response to a request for an electronic document. In this example, the user may capture a screenshot (referred to as the possibly encoded image or a candidate image) of the content, and transmit the screenshot to the image analysis and decoder module 118 for analysis, e.g., to inquire about the origin of the content presented to the user, and depicted by the possibly encoded image. While multiple images are received, they are not required to be received at the same time. For example, images can be obtained over a period of time, as they are submitted by users who are presented content on publishers' properties.

A determination is made as to whether each possibly encoded image (candidate image) includes a visually imperceptible watermark (420). In some implementations, the determination as to whether the candidate image includes a visually imperceptible watermark is performed by the watermark detection apparatus prior to any processing of the candidate image by the watermark decoder. Using the watermark detection apparatus to determine whether the candidate image includes a watermark prior to processing the image with the watermark decoder provides for a more efficient computing system. For example, a simpler (e.g., less computationally expensive) detection process can be used to detect the existence of a watermark in a received image before requiring the more computationally intensive decoder process to be performed. As such, the system can disregard any images in which a watermark is not detected without wasting resources required to perform the decoder process.

The watermark detection apparatus 132 can be implemented within the image analysis and decoder module 118, and can implement a detector machine learning model 132*a* that is configured to process the candidate image and generate, as output, an indication of whether the candidate image includes a portion of a watermark or one or more watermarks. For example, the detector machine learning model can be implemented as a classification model that can process the candidate image to classify the image as an image that includes watermarks or an image that does not include watermark.

In some implementations, the watermark detection apparatus can also implement the detector machine learning model to perform semantic image segmentation. For example, the detector machine learning model can process the candidate image to classify each pixel of the candidate image into a first class and a second class. In this example, the first class corresponds to pixels of the candidate image that are encoded (or overlapped during display on the client device) using the watermark image and the second class corresponds to pixels of the candidate image that are not encoded using the watermark image. In some implementations, the detector machine learning model can generate, as output, a segmentation mask that identifies a set of encoded pixels that are watermarked. For example, the detector machine learning model, after classifying the pixels of the candidate image into the first class and the second class, can generate a segmentation mask by assigning labels to the pixels pertaining to the class to which the pixels are assigned. For example, if a pixel of the candidate image is classified as the first class, it can be assigned a label "1" and if the pixel is classified as the second class, it can be assigned a label "0".

In some implementations, the determination of whether a candidate image includes a visually imperceptible watermark is performed using a detector machine learning model. In these implementations, the determination includes determining whether the candidate image includes the visually imperceptible watermark using a detector machine learning model trained to determine whether a region of an input image includes the visually imperceptible watermark based on a coarse analysis of the region that does not require a pixel by pixel analysis of the region. For example, a total number of encoded, or black, bits can be used as a condition for determining whether the candidate image includes a watermark. More specifically, if a region corresponding to the size of a watermark does not include a sufficient number of encoded, or black, bits, it is impossible for that region to contain a watermark, such that further processing of the image is not necessary.

The determination of whether the candidate image includes a visually imperceptible watermark can also be performed by classifying regions of the candidate image as watermarked or not watermarked based on a watermark condition. The watermark condition can include, for example, the threshold number of encoded bits, as discussed above, an encoded bit density threshold, an encoded bit distribution condition, or other conditions that can be indicative of a watermarked region of the candidate image. In these implementations, the set of encoded pixels in a region of the candidate image are determined, and the region is classified based on whether the set of encoded pixels meets the watermark condition. For example, if the encoded bit density (e.g., portion, such as a percentage, of total bits in the region that are identified as encoded) for a particular region of the candidate image is greater than an encoded bit density threshold, the region can be classified as a watermarked region. However, if the encoded bit density for the particular region is less than the encoded bit density threshold, the region can be classified as a not watermarked region.

Once a region of the candidate image has been classified, binary is can be output for all pixels in the region to mark the region as including the visually imperceptible watermark. These binary 1s can be used to generate a watermark map for the image. The watermark map indicates regions of the map that contain visually imperceptible watermarks. In some situations, each region can include the same watermark, such that irrespective of which portion of the image is analyzed or decoded, the information contained in the watermark can be recovered. In some situations, different regions of the image can include different watermarks that each carry different information, so as to increase the amount of information that can be encoded into a single image.

Each particular candidate image (particular image) is routed based on the determination of whether the particular image includes a visually imperceptible watermark. For example, in response to detecting a presence of watermark in the particular image, the particular image is routed to the watermark decoder 134 for decoding and extraction of the watermark. For particular images in which a presence of a watermark is not detected, those particular images are then ignored (or discarded) and not processed by the watermark decoder. In some implementations, the particular images in which watermarks are not detected, are filtered from further processing.

The visually imperceptible watermarks detected in particular images that were routed to the watermark decoder are decoded (430). In some implementations, the watermark decoder performs the decoding of the watermarks using a machine decoder machine learning model. For example, the decoder machine learning model is configured to process the candidate image and generate, as output, a decoded watermark image. The decoder machine learning model can be deep convolutional neural network (CNN) with a UNet architecture that is trained to predict the decoded watermark image. The decoder machine learning model can include a plurality of training parameters and the decoder machine learning model is trained on a second training dataset using a training process that can adjust the plurality of training parameters to generate a prediction (e.g., decoded watermark image) of the watermark image. The watermark can be decoded using a decoder machine learning model that is trained to decode visually imperceptible watermarks in the particular image irrespective of a zoom level of an item depicted in the image. For example, as discussed above, the set of training images used to train the decoder machine learning model can include multiple training images that depict watermarked items at different levels of zoom and with different image distortions. To improve the performance of the model the decoder machine learning model can be trained in floating point numbers using images that are represented by RGB unsigned integers. As discussed above, rounding techniques can be used to address the mismatch between the floating point numbers and the unsigned RGB integers.

The image analysis and decoder module 118 can determine that the watermark image of the candidate image was not decoded by the decoder machine learning model. For example, the candidate image can include distortions that may result in a lower likelihood (or predictive confidence) while generating the decoded watermark image. In another example, the zoom level for the candidate image that was provided as input to the decoder machine learning model can have a relatively small portion encoded with the watermarking image that may prove insufficient for the decoder machine learning model to generate the decoded watermark image with sufficient confidence. When it is determined that the watermark image of the candidate image was decoded, the decoded watermark image can be processed for validation. When it is determined that the watermark image of the candidate image was not decoded, one or more scaled versions of the candidate image can be generated and additional attempts to decode the watermark using the one or more scaled versions of the candidate image can be performed.

The decoded watermark image is validated (440). For example, to validate the authenticity of the decoded watermark image, the validation apparatus implemented within the server system can use the decoded watermark image to recover a corresponding encoding image and/or a corresponding plaintext data item. If the content depicted by the candidate image was provided to the client device 104 as a response from the server system 102, the validation apparatus 140 can validate the authenticity of the content depicted by the candidate image using the corresponding encoding image and/or a corresponding plaintext data item. For example, the corresponding encoding image and/or a corresponding plaintext data item is valid if the server system can identify the corresponding encoding image and/or a corresponding plaintext data item from the response records database. The server system can further determine, based on the corresponding encoding image and/or a corresponding plaintext data item, information about a source image (e.g., image content provided by an image provider), such as the provider of the source image and details of the response served for the particular request. If the corresponding encoding image and/or a corresponding plaintext data item cannot be identified, the server system can determine that the possibly encoded source image was not transmitted by the server system.

Figure 5:
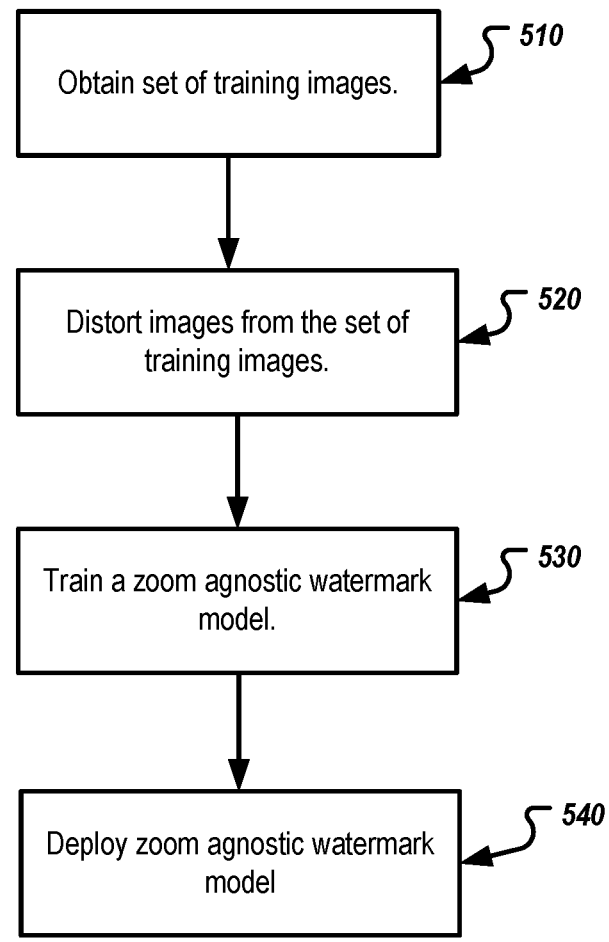
FIG. 5 is a flow diagram of an example process of training a zoom agnostic machine learning model (decoder machine learning model).

FIG. 5 is a flow diagram of an example process of training a zoom agnostic watermark model (e.g., the decoder machine learning model 134*b*). Operations of the process 500 can be implemented, for example, by the server system 102 that includes the image analysis and decoder module 118. Operations of the process 500 can also be implemented as instructions stored on one or more computer readable media which may be non-transitory, and execution of the instructions by one or more data processing apparatus can cause the one or more data processing apparatus to perform the operations of the process 500.

A set of training images are obtained (510). In some implementations, the set of training images are obtained by the server system 102, which includes one or more processors. The server system 102 can execute a training process to train the decoder machine learning model 134*a* using the set of training images. In order to execute the training process, the server system 102 obtains a set of training images (referred to as the second set of training images) that includes multiple training samples where each training sample includes a training image that is watermarked, a form of identification of the regions of the training image that includes the watermark (e.g., a segmentation mask identifying the watermarked pixels and the non-watermarked pixels) and a target that includes the watermark image of the watermark in the training image.

Images from among the set of training images are distorted (520). For example, the training process in order to enhance the generalization potential of the decoder machine learning model 134*a* can augment the second dataset by generating new training samples using the existing training samples of the second dataset. To generate the new training samples, distortions can be applied to the images to create distorted images. In some implementations, the images can be distorted by modifying resolutions of the images or applying visual perturbations that widely occur in real-world visual data such as horizontal and vertical flips, translations, rotation, cropping, color distortions, adding random noise etc. In some implementations, the training process can generate new training samples by encoding the training images into different file formats using lossy compression or transformation techniques. For example, the training process can use JPEG compression to introduce small artifacts in the training images and the training images generated after compression can be used to augment the first dataset. In some implementations, the distorted images can be created by changing a number of pixels used to represent a single pixel in an image.

In some implementations, the training process can further augment the second training dataset by rounding floating point numbers that represent color of pixels of the training images. In such situations, the training images are floating point images such as in ARRIRAW, Blackmagic RAW, DNG, DPX, EXR, PSD, and TIFF image formats. In such situations, the floating point numbers of the floating point images can be rounded using normal rounding where the rounded value is the closest decimal value to the floating point number. In another example, the floating point numbers of the floating point images can be rounded using floor rounding where the rounded value is the decimal portion of the floating point number.

In some implementations, the training process can further augment the second training dataset by generating one or more scaled versions of the training images so as to train the decoder machine learning model 134a in a way that is agnostic to the zoom level of the possibly encoded image 302. For example, a single training image can be zoomed in and/or out to create different zoomed versions of that image. The various zoomed versions of the image can be included in the set of training images that are used to train the models, so that the models are capable of detecting and/or decoding visually imperceptible watermarks in images irrespective of the zoom levels of candidate images that are input to the model.

A zoom agnostic watermark decoder model is trained (530). In some implementations, the zoom agnostic watermark decoder model is trained to decode visually imperceptible water marks in candidate images that are input to the model, and the decoding can be performed by the model across multiple different zoom levels of the input images. For example, the server system 102 can execute the training process that can adjust the plurality of parameters of the decoder machine learning model 134a using a loss function such as a L2 loss. For example, a pixel-wise cross entropy loss can examine each pixel individually to compare the pixels predictions of the decoded (predicted) watermark image 320 with the pixels of the target watermark image and adjust the parameters of the decoder machine learning model 134a accordingly. The training process can be iterative in nature where during each iteration, the training process aims to minimize the cross entropy loss until the loss is less than a specified threshold or until the training process has executed a specified number of iterations.

In some implementations, the zoom agnostic watermark decoder model is trained using two or more different zoomed images created from a same image among the set of training images. In these implementations, each of the two different zoomed images can use a different number of pixels to represent a single pixel of the same image.

Using the zoomed images, a zoom agnostic watermark detection model can also be trained to detect a presence of the visually imperceptible watermark within the input images across multiple zoom levels of the input images. In some implementations, the detection is performed independent of decoding the visually imperceptible watermark using the decoder model.

The zoom agnostic watermark model is deployed (540). For example, after training the decoder machine learning model 134a, server system 102 can start to receive candidate images. If the presence of a watermark is detected in the candidate image, the server system 102 can use the decoder machine learning model 134a to generate the decoded watermark image 320.

Figure 6:
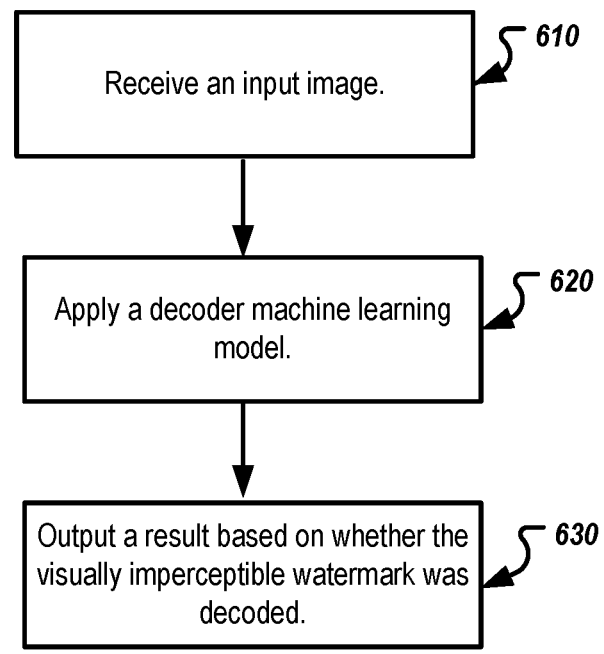
FIG. 6 is a flow diagram of an example process of decoding a captured source image (e.g., a screenshot) that includes one or more watermarking images.

FIG. 6 is a flow diagram of an example process 600 of decoding a possibly encoded image. Operations of the process 600 can be implemented, for example, by the server system 102 that includes the image analysis and decoder module 118. Operations of the process 600 can also be implemented as instructions stored on one or more computer readable media which may be non-transitory, and execution of the instructions by one or more data processing apparatus can cause the one or more data processing apparatus to perform the operations of the process 600.

An input image is received by the watermark decoder 134 (610). For example, in response to detecting a presence of watermark in the particular image, the particular image is routed to the watermark decoder 134 for decoding and extraction of the watermark, as previously discussed.

A decoder machine learning model is applied to the input image (620). The watermark decoder 134 performs the decoding of the watermarks using a decoder machine learning model 134a. The decoder machine learning model is configured to process the input image (also referred to as a candidate image) and generate, as output, a decoded watermark image. The decoder machine learning model can be a deep convolutional neural network (CNN) with a UNet architecture that is trained to predict the decoded watermark image. The decoder machine learning model can include a plurality of training parameters and the decoder machine learning model is trained on a second training dataset using a training process that can adjust the plurality of training parameters to generate a prediction (e.g., decoded watermark image) of the watermark image.

The watermark can be decoded using a decoder machine learning model that is trained to visually imperceptible watermarks in the particular image irrespective of a zoom level of an item depicted in the image. For example, as discussed above, the second set of training images used to train the decoder machine learning model can include multiple training images that depict watermarked items at different levels of zoom and with different image distortions. To improve the performance of the model the decoder machine learning model can be trained using floating point numbers using images that are represented by RGB unsigned integers. As discussed above, rounding techniques can be used to address the mismatch between the floating point numbers and the unsigned RGB integers.

The image analysis and decoder module 118 determines whether the decoded watermark image was predicted. In some implementations, the determination includes determining whether a visually imperceptible watermark was decoded through application of the decoder machine learning model to the input image to obtain a decoded watermark. For example, the image analysis and decoder module 118 can determine that the watermark image of the candidate image was not decoded by the decoder machine learning model. In this example, the candidate image may include severe distortions that may result in a lower likelihood (or predictive confidence) while generating the decoded watermark image, thereby resulting in a determination that the watermark image was not decoded with sufficient confidence. In another example, the zoom level for the candidate image that was provided as input to the decoder machine learning model may have a relatively small portion encoded with the watermarking image that may prove insufficient for the decoder machine learning model to generate the decoded watermark image with sufficient confidence. When it is determined that the watermark image of the candidate image was decoded, the decoded watermark image can be processed for validation. When it is determined that the watermark image of the candidate image was not decoded, one or more scaled versions of the candidate image can be generated and additional attempts to decode the watermark using the one or more scaled versions of the candidate image can be performed.

A result is output based on whether the visually imperceptible watermark was decoded through application of the decoder machine learning model to the input image (630). After generating the decoded watermark image 320 by processing the possibly encoded image 302, the watermark decoder 134 can generate, as output, the decoded watermark image 320 that can be used by the image analysis and decoder module 118 to validate the authenticity (or source) of the possibly encoded image 302.

To validate the authenticity (or source), the validation apparatus 140 implemented within the server system 102 can use the decoded watermark image 320 to recover a corresponding encoding image 124 and/or a corresponding plaintext data item 122. If the possibly encoded image 302 was provided to the client device 104 as a response from the server system 102, the validation apparatus 140 can validate the authenticity of the possibly encoded image 302 using the corresponding encoding image 124 and/or a corresponding plaintext data item 122.

In some implementations, the watermark decoder 134 can generate, as output, a decoded watermark image 320 that is scaled from its original zoom level according to the scaling performed on the version of the possibly encoded image 302. For example, the output can include a zoomed output that is generated in response to determining that the visually imperceptible watermark was decoded through application of the decoder machine learning model to the input image. In a specific example, the decoded watermark may have a zoom level corresponding to a zoom level of items depicted by the input image, but to generate the decoded watermark image 320, the watermark decoder 134 can generate a 200 percent (2×) zoom level (or some other zoom level) scaled version of the possibly encoded image 302 using the zoom apparatus 138. In such a situation, the decoded watermark image 320 generated by the decoder machine learning model 134a can be zoomed to assist in the decoding process. The zoomed output is a version of the decoded watermark in which a single pixel of the decoded watermark is depicted using more than one pixel in the zoomed output, such that the resolution of the watermark is increased. This can lead to easier and/or more reliable reading of the watermark.

In some situations, the visually imperceptible watermark may not initially be decoded through application of the decoder machine learning model to the input image. In these situations, the decoder machine learning model can be reapplied to a zoomed version of the input image. For example, as discussed above, a zoom trick can be used to increase the resolution of a watermark in the input image, which can lead to more reliable decoding of the watermark. The reapplication of the decoder machine learning model to a zoomed version of the input image can include zooming the input image by at least a two times multiplier to create the zoomed version of the input image in which at least two pixels in the zoomed version of the input image are used to depict a single pixel in the input image. Once zoomed, the decoder machine learning model can be reapplied to the zoomed version of the input image, and a result can again be output.

In some implementations, additional operations can be performed prior to applying the decoder machine learning model to the input image. For example, the input image can be processed using a detector machine learning model that is applied to the input image. In these implementations, application of the detector machine learning model to the input image can generate a segmentation mask that highlights watermarked regions of the input image, as previously discussed in detail. This segmentation mask can be used to determine that the input image includes a visually imperceptible watermark that is to be decoded. The segmentation mask can also be used to determine a zoom level of the input image. For example, the zoom level of the input image can be determined based on a number of pixels used to represent the visually imperceptible watermark in the segmentation mask relative to a number of pixels used to represent the visually imperceptible watermark in unzoomed images. In a specific example, assume that the watermark that is overlaid on an image (or other visual content) is a 100×100 pixel square, but that the segmentation mask is 300×300 pixels. In this example, the determination can be made that the zoom level of the input image is 300% (3×) because the dimensions of the segmentation mask are 3 times greater than the dimensions of the known size of the watermark in unzoomed images. This information can be output as part of the result, and used to either scale the input image for further processed (e.g., by the decoder machine learning model) or to inform other models or processing units of the scale of the input image.

Figure 7:
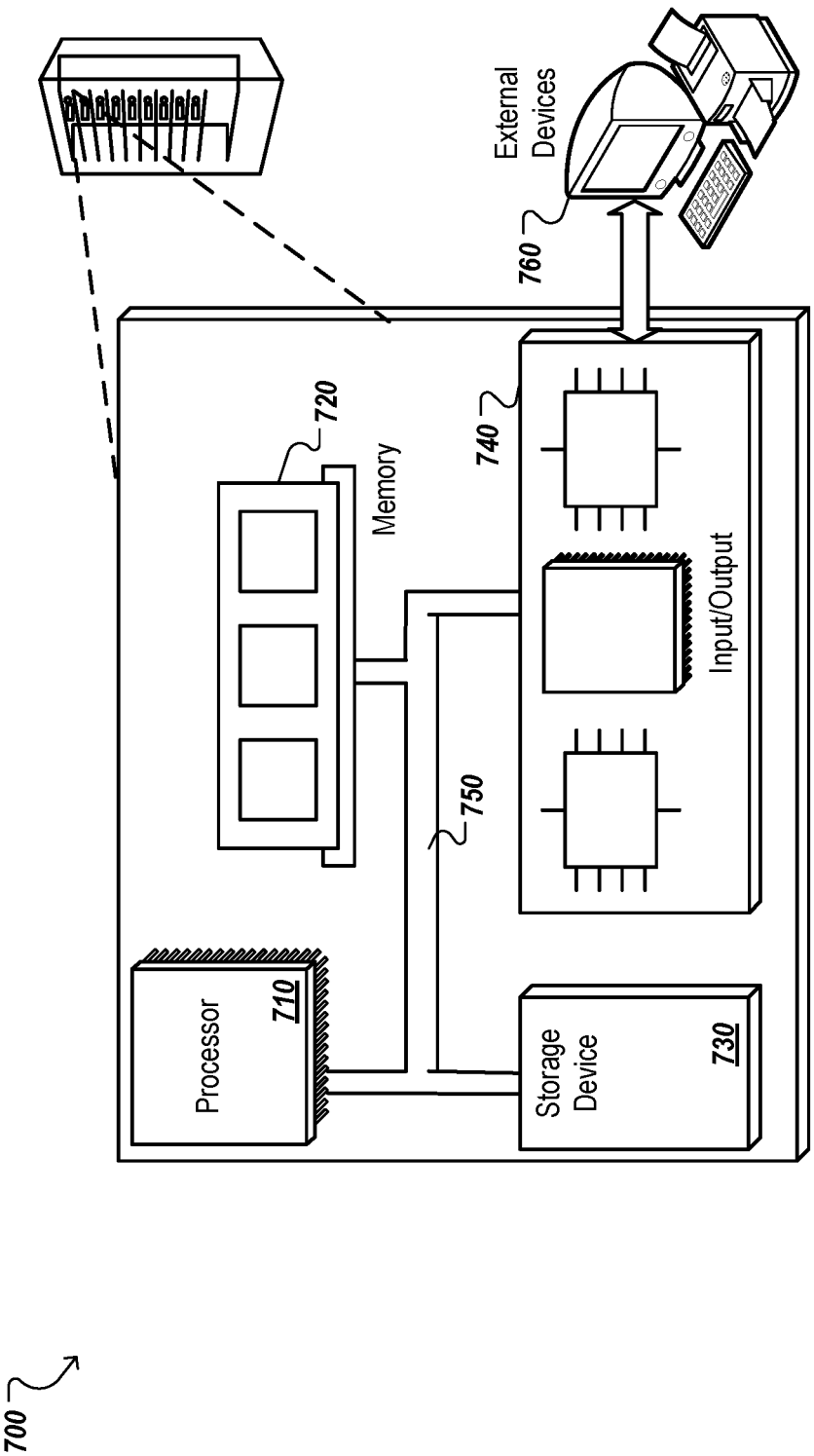
FIG. 7 is a block diagram of an example computer system.

FIG. 7 is a block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In some implementations, the memory 720 is a volatile memory unit. In another implementation, the memory 720 is a non-volatile memory unit.

The storage device 730 is capable of providing mass storage for the system 700. In some implementations, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In some implementations, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 760, e.g., keyboard, printer and display devices. Other implementations, however, can also be used, such as mobile computing devices, mobile communication devices, set-top box television client devices, etc.

Although an example processing system has been described in FIG. 1-6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, by a watermark decoder including one or more processors, an input image;
   applying, by the watermark decoder and to the input image, a decoder machine learning model trained to decode visually imperceptible watermarks at different levels of zoom;
   determining, by the watermark decoder, whether a visually imperceptible watermark was decoded through application of the decoder machine learning model to the input image to obtain a decoded watermark; and
   outputting a result based on the determination whether the visually imperceptible watermark was decoded through application of the decoder machine learning model to the input image, including outputting a zoomed output in response to determining that the visually imperceptible watermark was decoded through application of the decoder machine learning model to the input image.

2. The computer-implemented method of claim 1, wherein outputting a zoomed output comprises outputting a zoomed version of the decoded watermark, wherein the decoded watermark has a zoom level corresponding to a zoom level of items depicted in the input image.

3. The computer-implemented method of claim 2, wherein outputting a zoomed output comprises outputting a version of the decoded watermark in which a single pixel of the decoded watermark is depicted using more than one pixel in the zoomed output.

4. The computer-implemented method of claim 1, wherein outputting a result based on the determination whether the visually imperceptible watermark was decoded through application of the decoder machine learning model to the input image comprises reapplying the decoder machine learning model to a zoomed version of the input image in response to determining that the visually imperceptible watermark was not decoded through application of the decoder machine learning model to the input image.

5. The computer-implemented method of claim 4, wherein reapplying the decoder machine learning model to a zoomed version of the input image comprises:
   zooming the input image by at least a two times multiplier to create the zoomed version of the input image; and
   reapplying the decoder machine learning model to the zoomed version of the input image.

6. The computer-implemented method of claim 5, wherein zooming the input image by at least a two times multiplier comprises using at least two pixels in the zoomed version of the input image to depict a single pixel in the input image.

7. The computer-implemented method of claim 1, further comprising:
   applying a detector machine learning model to the input image;
   generating, based on application of the detector machine learning model to the input image, a segmentation mask that highlights watermarked regions of the input image;
   determining, based on the segmentation mask, that the input image includes a visually imperceptible watermark; and determining, based on the segmentation mask a zoom level of the input image based on a number of pixels used to represent the visually imperceptible watermark in the segmentation mask relative to a number of pixels used to represent the visually imperceptible watermark in unzoomed images.

8. A system comprising:
a data storage device;
a watermark decoder, including one or more processors, configured to perform operations comprising:
receiving, by a watermark decoder including one or more processors, an input image;
applying, by the watermark decoder and to the input image, a decoder machine learning model trained to decode visually imperceptible watermarks at different levels of zoom;
determining, by the watermark decoder, whether a visually imperceptible watermark was decoded through application of the decoder machine learning model to the input image to obtain a decoded watermark; and
outputting a result based on the determination whether the visually imperceptible watermark was decoded through application of the decoder machine learning model to the input image, including outputting a zoomed output in response to determining that the visually imperceptible watermark was decoded through application of the decoder machine learning model to the input image.

9. The system of claim 8, wherein outputting a zoomed output comprises outputting a zoomed version of the decoded watermark, wherein the decoded watermark has a zoom level corresponding to a zoom level of items depicted in the input image.

10. The system of claim 9, wherein outputting a zoomed output comprises outputting a version of the decoded watermark in which a single pixel of the decoded watermark is depicted using more than one pixel in the zoomed output.

11. The system of claim 8, wherein outputting a result based on the determination whether the visually imperceptible watermark was decoded through application of the decoder machine learning model to the input image comprises reapplying the decoder machine learning model to a zoomed version of the input image in response to determining that the visually imperceptible watermark was not decoded through application of the decoder machine learning model to the input image.

12. The system of claim 11, wherein reapplying the decoder machine learning model to a zoomed version of the input image comprises:
zooming the input image by at least a two times multiplier to create the zoomed version of the input image; and
reapplying the decoder machine learning model to the zoomed version of the input image.

13. The system of claim 12, wherein zooming the input image by at least a two times multiplier comprises using at least two pixels in the zoomed version of the input image to depict a single pixel in the input image.

14. The system of claim 8, further comprising:
applying a detector machine learning model to the input image;
generating, based on application of the detector machine learning model to the input image, a segmentation mask that highlights watermarked regions of the input image;
determining, based on the segmentation mask, that the input image includes a visually imperceptible watermark; and
determining, based on the segmentation mask a zoom level of the input image based on a number of pixels used to represent the visually imperceptible watermark in the segmentation mask relative to a number of pixels used to represent the visually imperceptible watermark in unzoomed images.

15. A non-transitory computer readable medium storing instructions that, when executed by one or more data processing apparatus, cause the one or more data processing apparatus to perform operations comprising:
receiving, by a watermark decoder including one or more processors, an input image;
applying, by the watermark decoder and to the input image, a decoder machine learning model trained to decode visually imperceptible watermarks at different levels of zoom;
determining, by the watermark decoder, whether a visually imperceptible watermark was decoded through application of the decoder machine learning model to the input image to obtain a decoded watermark; and
outputting a result based on the determination whether the visually imperceptible watermark was decoded through application of the decoder machine learning model to the input image, including outputting a zoomed output in response to determining that the visually imperceptible watermark was decoded through application of the decoder machine learning model to the input image.

16. The non-transitory computer readable medium of claim 15, wherein outputting a zoomed output comprises outputting a zoomed version of the decoded watermark, wherein the decoded watermark has a zoom level corresponding to a zoom level of items depicted in the input image.

17. The non-transitory computer readable medium of claim 16, wherein outputting a zoomed output comprises outputting a version of the decoded watermark in which a single pixel of the decoded watermark is depicted using more than one pixel in the zoomed output.

18. The non-transitory computer readable medium of claim 15, wherein outputting a result based on the determination whether the visually imperceptible watermark was decoded through application of the decoder machine learning model to the input image comprises reapplying the decoder machine learning model to a zoomed version of the input image in response to determining that the visually imperceptible watermark was not decoded through application of the decoder machine learning model to the input image.

19. The non-transitory computer readable medium of claim 18, wherein reapplying the decoder machine learning model to a zoomed version of the input image comprises:
zooming the input image by at least a two times multiplier to create the zoomed version of the input image; and
reapplying the decoder machine learning model to the zoomed version of the input image.

20. The non-transitory computer readable medium of claim 15, further comprising:
applying a detector machine learning model to the input image;
generating, based on application of the detector machine learning model to the input image, a segmentation mask that highlights watermarked regions of the input image;

determining, based on the segmentation mask, that the input image includes a visually imperceptible watermark; and determining, based on the segmentation mask a zoom level of the input image based on a number of pixels used to represent the visually imperceptible watermark in the segmentation mask relative to a number of pixels used to represent the visually imperceptible watermark in unzoomed images.

\* \* \* \* \*